United States Patent
Ahn et al.

(10) Patent No.: US 12,034,161 B2
(45) Date of Patent: Jul. 9, 2024

(54) POSITIVE ELECTRODE ACTIVE MATERIAL FOR LITHIUM SECONDARY BATTERY AND LITHIUM SECONDARY BATTERY

(71) Applicant: LG Chem, Ltd., Seoul (KR)

(72) Inventors: Dong Joon Ahn, Daejeon (KR); Seo Hee Ju, Daejeon (KR); Sung Soon Park, Daejeon (KR); Kang Hyeon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 808 days.

(21) Appl. No.: 17/058,324

(22) PCT Filed: Jun. 20, 2019

(86) PCT No.: PCT/KR2019/007452
§ 371 (c)(1),
(2) Date: Nov. 24, 2020

(87) PCT Pub. No.: WO2019/245306
PCT Pub. Date: Dec. 26, 2019

(65) Prior Publication Data
US 2021/0218023 A1 Jul. 15, 2021

(30) Foreign Application Priority Data
Jun. 20, 2018 (KR) .................. 10-2018-0071056

(51) Int. Cl.
*H01M 4/525* (2010.01)
*H01M 4/36* (2006.01)
(Continued)

(52) U.S. Cl.
CPC .......... *H01M 4/525* (2013.01); *H01M 4/366* (2013.01); *H01M 4/505* (2013.01); *H01M 4/628* (2013.01);
(Continued)

(58) Field of Classification Search
CPC ...... H01M 4/525; H01M 4/366; H01M 4/505; H01M 4/628; H01M 10/0525; H01M 2004/028
See application file for complete search history.

(56) References Cited

U.S. PATENT DOCUMENTS

2006/0234127 A1  10/2006 Kim et al.
2011/0206988 A1   8/2011 Tanaka et al.
(Continued)

FOREIGN PATENT DOCUMENTS

CN  1795573 A   6/2006
CN  102234119 A  11/2011
(Continued)

OTHER PUBLICATIONS

Extended European Search Report including Written Opinion for Application No. 19822364.6 dated May 27, 2021, pp. 1-8.
(Continued)

*Primary Examiner* — Jimmy Vo
(74) *Attorney, Agent, or Firm* — Lerner David LLP

(57) ABSTRACT

Provided is a lithium secondary battery which includes a positive electrode, a negative electrode, a separator interposed between the positive electrode and the negative electrode, and an electrolyte, wherein the positive electrode includes, as a positive electrode active material, a lithium composite transition metal oxide powder having a layered structure and a nickel content accounting for 50 atm % to 75 atm % of total transition metals, and wherein the lithium composite transition metal oxide powder undergoes a 3% or less change in lithium-oxygen (Li—O) interlayer spacing (i.e., $LiO_6$ slab thickness) in a state-of-charge (SOC) range of 58% to 86%.

6 Claims, 4 Drawing Sheets

(51) Int. Cl.
  *H01M 4/505* (2010.01)
  *H01M 4/62* (2006.01)
  *H01M 10/0525* (2010.01)
  *H01M 4/02* (2006.01)

(52) U.S. Cl.
  CPC .. *H01M 10/0525* (2013.01); *H01M 2004/028* (2013.01)

(56) References Cited

U.S. PATENT DOCUMENTS

| | | |
|---|---|---|
| 2012/0315541 A1 | 12/2012 | Sasaki et al. |
| 2013/0323606 A1 | 12/2013 | Yoshida et al. |
| 2015/0072232 A1 | 3/2015 | Nagai |
| 2016/0013471 A1* | 1/2016 | Kaseda ............... H01M 4/131 429/223 |
| 2017/0054147 A1 | 2/2017 | Yokoyama et al. |
| 2017/0263920 A1* | 9/2017 | Choi ................... H01M 4/485 |
| 2018/0233739 A1 | 8/2018 | Park et al. |
| 2019/0020022 A1 | 1/2019 | Jeong et al. |

FOREIGN PATENT DOCUMENTS

| | | |
|---|---|---|
| CN | 102859777 A | 1/2013 |
| CN | 104078669 A | 10/2014 |
| CN | 104143633 A | 11/2014 |
| CN | 106356526 A | 1/2017 |
| DE | 112012006167 T5 | 12/2014 |
| EP | 3282506 A1 | 2/2018 |
| EP | 3333961 A1 | 6/2018 |
| JP | 2002124261 A | 4/2002 |
| JP | 2005251716 A | 9/2005 |
| JP | 2005332713 A | 12/2005 |
| JP | 2011-054334 A | 3/2011 |
| JP | 2011-082150 A | 4/2011 |
| JP | 5128018 B1 | 1/2013 |
| JP | 2014116161 A | 6/2014 |
| JP | 2015164123 A | 9/2015 |
| JP | 2015216105 A | 12/2015 |
| JP | 2016091633 A | 5/2016 |
| JP | 2016207316 A | 12/2016 |
| JP | 2017043496 A | 3/2017 |
| JP | 2017162790 A | 9/2017 |
| KR | 2009-0004684 A | 1/2009 |
| KR | 20120084585 A | 7/2012 |
| KR | 2016-0022103 A | 2/2016 |
| KR | 20160026306 A | 3/2016 |
| KR | 20160075404 A | 6/2016 |
| KR | 20170063407 A | 6/2017 |
| KR | 20170103389 A | 9/2017 |

OTHER PUBLICATIONS

International Search Report for Application No. PCT/KR2019/007452 dated Oct. 1, 2019, 2 pages.
Search Report dated Jan. 29, 2024 from Office Action for Chinese Application No. 201980034471.5 issued Feb. 1, 2024. 3 pgs.

* cited by examiner

[FIG. 1]
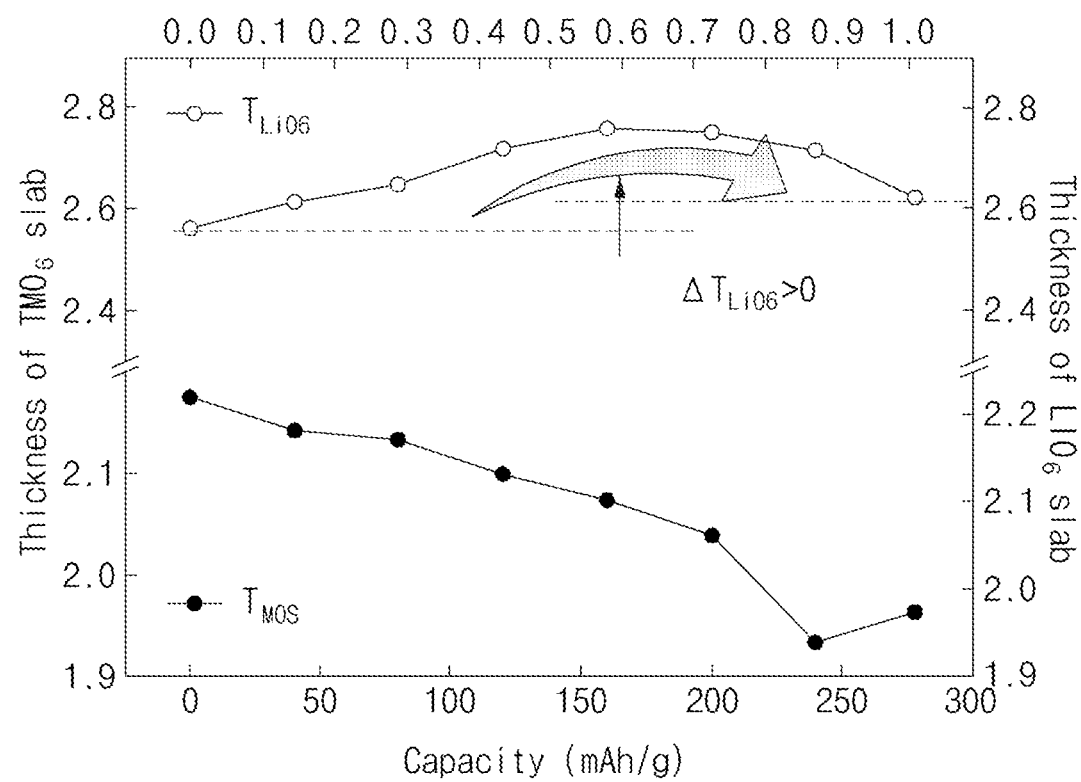

[FIG. 2]
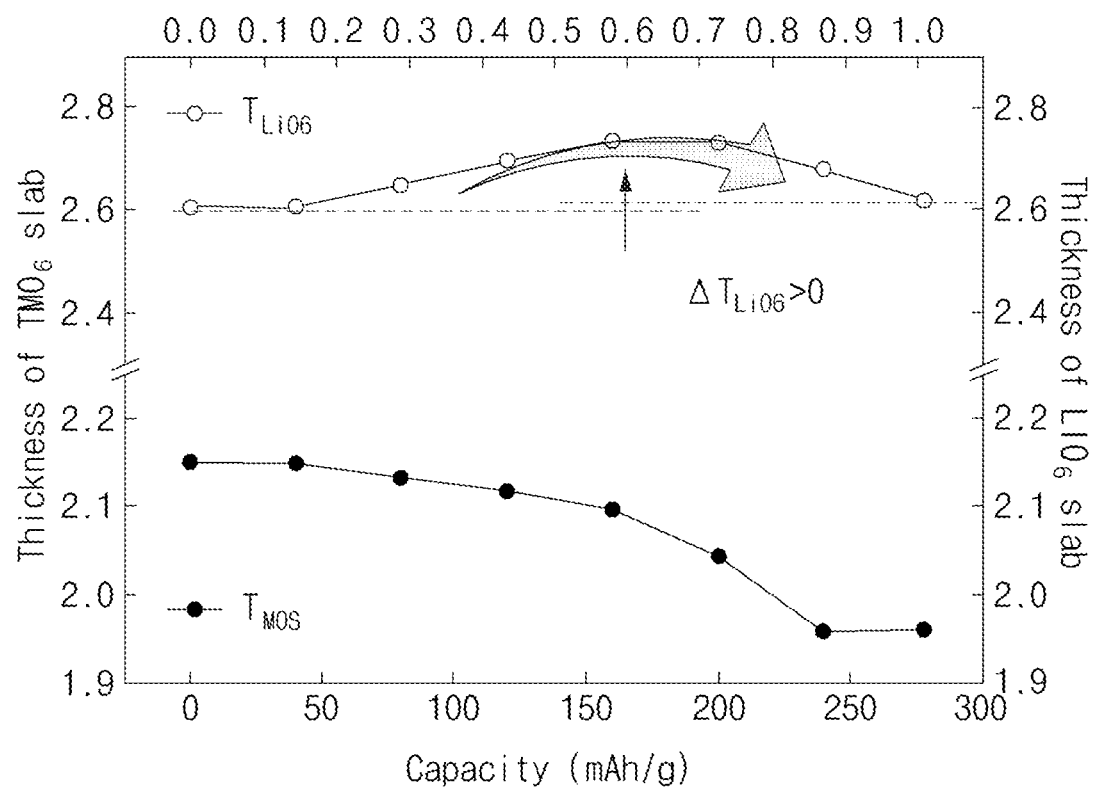

[FIG. 3]
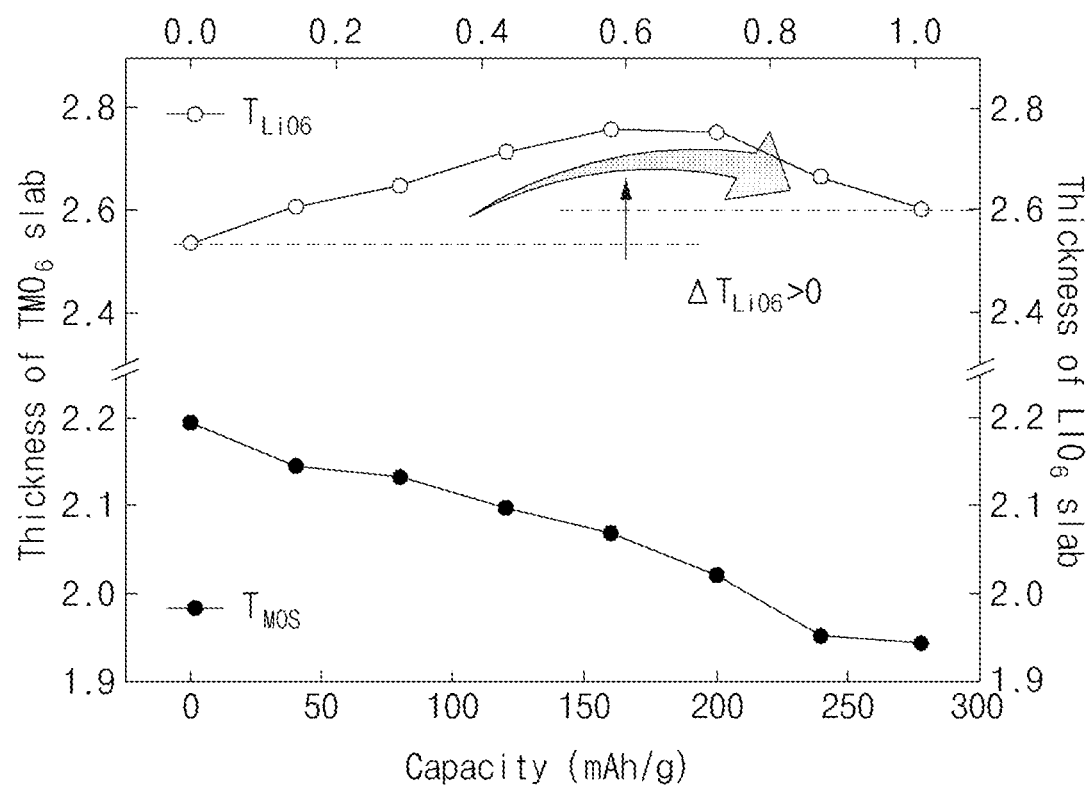

[FIG. 4]
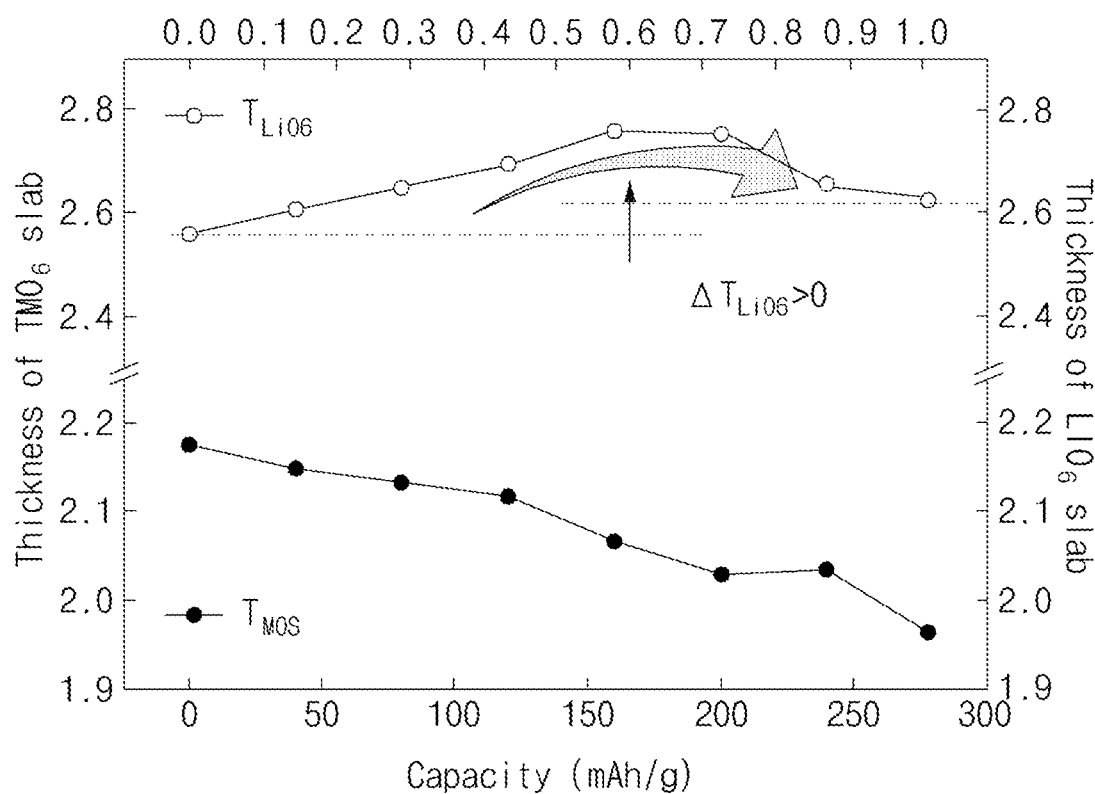

POSITIVE ELECTRODE ACTIVE MATERIAL FOR LITHIUM SECONDARY BATTERY AND LITHIUM SECONDARY BATTERY

CROSS-REFERENCE TO RELATED APPLICATION

This application is a national phase entry under 35 U.S.C. § 371 of International Application No. PCT/KR2019/007452, filed on Jun. 20, 2019, which claims priority to and the benefit of Korean Patent Application No. 10-2018-0071056, filed on Jun. 20, 2018, the disclosures of which are incorporated herein by reference in their entirety.

TECHNICAL FIELD

The present invention relates to a lithium secondary battery, and more particularly, to a lithium secondary battery exhibiting excellent electrochemical properties even in high-voltage operation.

BACKGROUND ART

Recently, with the popularization of mobile devices and an increasing demand for environmentally-friendly electric vehicles, the specifications required for the energy sources for driving those devices are becoming increasingly strict. In particular, in order to satisfy high-capacity and high-output requirements, there is a need for the development of a lithium secondary battery that has a long lifetime and is stably operated under a high-voltage condition.

Lithium transition metal composite oxides have been used as a positive electrode active material for a lithium secondary battery, and among these, $LiCoO_2$, which is a lithium cobalt composite metal oxide having a high operating voltage and excellent capacity characteristics, has been mainly used. However, $LiCoO_2$ not only has very poor thermal properties due to the destabilization of its crystal structure resulting from lithium deintercalation but also is expensive, and therefore, it has a limitation in being used in large quantities as a power source in the electric vehicle field and the like.

As a material for replacing $LiCoO_2$, lithium manganese composite metal oxides ($LiMnO_2$, $LiMn_2O_4$, etc.), lithium iron phosphate compounds ($LiFePO_4$, etc.), lithium nickel composite metal oxides ($LiNiO_2$, etc.) and the like have been developed, but $LiNiO_2$ has problems such as poor thermal stability as compared to $LiCoO_2$, and when an internal short circuit occurs in a charged state due to a pressure applied from the outside or the like, the positive electrode active material itself is decomposed, causing the battery to rupture and be ignited.

Accordingly, as a method for improving the low thermal stability of $LiNiO_2$ while maintaining the excellent reversible capacity thereof, nickel-cobalt-manganese-based lithium composite transition metal oxides (hereinafter, simply referred to as "NCM-based lithium oxides"), in which a part of the nickel is substituted with manganese (Mn) and cobalt (Co), have been developed. However, the structure of such NCM-based lithium oxides becomes increasingly unstable as lithium ions are repeatedly intercalated and deintercalated through charging and discharging, and a resulting change in the structure of the oxides leads to the degradation of lifetime characteristics, and such a phenomenon is particularly pronounced under high-voltage operation. In particular, the charging voltage affects the degree of lithium ion deintercalation in the positive electrode active material and thereby has a direct influence on an increase in the surface instability of the positive electrode active material due to a side reaction with an electrolyte and on the structural disintegration of a lithium-transition-metal layer in the positive electrode active material.

Therefore, various techniques for improving the structural stability of a positive electrode active material have been researched, but with the techniques proposed to date, it has been difficult to sufficiently realize electrochemical properties in high-voltage operation.

Therefore, there is a need for the development of a lithium secondary battery exhibiting excellent electrochemical performance even in high-voltage operation.

DISCLOSURE

Technical Problem

The present invention is directed to providing a lithium secondary battery exhibiting excellent electrochemical properties even in high-voltage operation.

Technical Solution

One aspect of the present invention provides a lithium secondary battery which includes a positive electrode, a negative electrode, a separator interposed between the positive electrode and the negative electrode, and an electrolyte, wherein the positive electrode includes, as a positive electrode active material, a lithium composite transition metal oxide powder having a layered structure and a nickel content accounting for 50 atm % to 75 atm % of total transition metals, and wherein the lithium composite transition metal oxide powder undergoes a 3% or less, preferably 2% or less, change in lithium-oxygen (Li—O) interlayer spacing (i.e., $LiO_6$ slab thickness) in a state of charge (SOC) range of 58% to 86%.

The lithium composite transition metal oxide may undergo a 6% or more change in transition metal-oxygen (TM-O) interlayer spacing in a SOC range of 58% to 86%.

In addition, the lithium composite transition metal oxide may be represented by the following Chemical Formula 1.

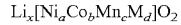   [Chemical Formula 1]

In Chemical Formula 1, M is one or more elements selected from the group consisting of Zr, W, Al, Ti, Mg and Co, and 0.9≤x≤1.2, 0.50≤a≤0.75, 0<b<0.4, 0<c<0.4, and 0<d<0.2.

In addition, the lithium composite transition metal oxide may include, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S.

Another aspect of the present invention provides a positive electrode active material for a lithium secondary battery, the positive electrode active material including a lithium composite transition metal oxide powder having a layered structure and a nickel content accounting for 50 atm % to 75 atm % of total transition metals, wherein the lithium composite transition metal oxide powder undergoes a 3% or less, preferably 2% or less, change in Li—O interlayer spacing (i.e., $LiO_6$ slab thickness) in a SOC range of 58% to 86%.

Advantageous Effects

Due to the inclusion of a positive electrode which includes a positive electrode active material undergoing a small change in Li—O interlayer spacing due to lithium ion deintercalation during charging and discharging, the lithium secondary battery of the present invention exhibits excellent electrochemical properties even at high voltage.

DESCRIPTION OF DRAWINGS

FIG. 1 is a graph illustrating a change in the Li—O interlayer spacing ($T_{LiO6}$) and TM-O interlayer spacing ($T_{MO6}$) of a positive electrode active material prepared in Preparation Example 1 according to a degree of charging.

FIG. 2 is a graph illustrating a change in the Li—O interlayer spacing ($T_{LiO6}$) and TM-O interlayer spacing ($T_{MO6}$) of a positive electrode active material prepared in Preparation Example 2 according to a degree of charging.

FIG. 3 is a graph illustrating a change in the Li—O interlayer spacing ($T_{LiO6}$) and TM-O interlayer spacing ($T_{MO6}$) of a positive electrode active material prepared in Preparation Example 3 according to a degree of charging.

FIG. 4 is a graph illustrating a change in the Li—O interlayer spacing ($T_{LiO6}$) and TM-O interlayer spacing ($T_{MO6}$) of a positive electrode active material prepared in Preparation Example 4 according to a degree of charging.

DETAILED DESCRIPTION

Hereinafter, the present invention will be described in more detail.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present specification, a particle diameter Dn refers to a particle diameter corresponding to an n % point in a particle number cumulative distribution by particle diameter. That is, D50 is the particle diameter corresponding to a 50% point in the particle number cumulative distribution by particle diameter, D90 is the particle diameter corresponding to a 90% point in the particle number cumulative distribution by particle diameter, and D10 is the particle diameter corresponding to a 10% point in the particle number cumulative distribution by particle diameter.

The Dn may be determined using a laser diffraction method. Specifically, a powder to be analyzed is dispersed in a dispersion medium, and the dispersion is introduced into a commercially available laser diffraction particle size measuring instrument (e.g., Microtrac S3500) in which a particle size distribution is obtained by measuring a change in diffraction pattern according to a particle size while particles are passed through a laser beam. By calculating the particle diameters corresponding to the 10%, 50% and 90% points in the particle number cumulative distribution by particle diameter obtained by the measuring instrument, the D10, the D50 and the D90 can be determined.

As a result of the prolonged research to develop a lithium secondary battery that exhibits excellent electrochemical performance at high voltage, the inventors of the present invention have found that the objective is achievable by using a positive electrode active material that undergoes a small change in Li—O interlayer spacing in a specific SOC range, and thereby completed the present invention.

Conventionally, it has been common to analyze the crystal structure of a positive electrode active material by an X-ray diffraction (XRD) method. However, with this conventional method, it has not been able to measure a change in the crystal structure of a positive electrode active material according to a degree of charging due to the difficulty of precise measurement.

Hence, the inventors of the present invention measured a change in the crystal structure of a positive electrode active material according to a degree of charging by obtaining high resolution powder diffraction (hereinafter abbreviated as HRPD) data using synchrotron radiation and found that, in a specific range corresponding to a charged state, the degree of change in the Li—O interlayer spacing of the positive electrode active material closely affected the performance of the lithium secondary battery at high voltage, and thereby completed the present invention. Specifically, it was found that when a positive electrode active material having a layered structure and a nickel content accounting for 50 atm % to 75 atm % of total transition metals and undergoing a small, 3% or less change in Li—O interlayer spacing in a SOC range of 58% to 86% was used, excellent battery performance was attained even in high-voltage operation.

According to the research conducted by the inventors of the present invention, even among positive electrode active materials of similar compositions and the same Li—O interlayer spacing before charging and discharging, the lifetime characteristics and capacity characteristics in high-voltage operation were different depending on how the interlayer spacing changed in a SOC range of 58% to 86%.

In a Ni-rich positive electrode active material having a layered structure, the mechanism whereby a change in Li—O interlayer spacing in a SOC range of 58% to 86% affects the lifetime characteristics and capacity characteristics in high-voltage operation is assumed as follows, although not clear. The lithium composite transition metal oxides having a layered crystal structure have a form in which a Li—O layer and a TM-O layer are alternately stacked, and when charging, the interlayer spacing is changed as a result of the charge compensation occurring to compensate for the loss of lithium ions following the deintercalation of lithium from the Li—O layers. In general, the interlayer spacing increases in a SOC range of 50% to 60% and decreases as the charging further proceeds. However, when the interlayer spacing is drastically reduced during such a change, the capacity characteristics, lifetime characteristics and the like of the lithium secondary battery are degraded, possibly because an irreversible structural change has occurred in the lattice structure due to the occurrence of an additional strain therein.

Therefore, in the present invention, the capacity characteristics and high-temperature lifetime characteristics of a lithium secondary battery are improved by using a positive electrode active material that undergoes a small change in Li—O interlayer spacing in a SOC range of 58% to 86%.

More specifically, the lithium secondary battery of the present invention includes a positive electrode, a negative electrode, a separator interposed between the positive electrode and the negative electrode, and an electrolyte, wherein the positive electrode includes, as a positive electrode active material, a lithium composite transition metal oxide powder which has a layered structure and a nickel content accounting for 50 atm % to 75 atm % of total transition metals, wherein the lithium composite transition metal oxide powder undergoes a 3% or less change in Li—O interlayer spacing in a SOC range of 58% to 86%.

Hereinafter, each component of the present invention will be described in detail.

(1) Positive Electrode

The positive electrode of the present invention includes a positive electrode active material layer, and the positive electrode active material layer includes, as a positive electrode active material, a lithium composite transition metal oxide having a layered structure and a nickel content accounting for 50 atm % to 75 atm % of total transition metals.

For example, the lithium composite transition metal oxide may be represented by the following Chemical Formula 1.

$Li_x[Ni_aCo_bMn_cM_d]O_2$ [Chemical Formula 1]

In Chemical Formula 1, M is a doping element substituted at transition metal sites, and serves to improve the structural stability of the positive electrode active material. M may be, for example, one or more elements selected from the group consisting of Zr, W, Al, Ti, Mg and Co. Preferably, M includes two or more elements selected from the group consisting of Zr, W, Al, Ti, Mg and Co. More preferably, M includes Zr and Co.

x represents the atomic fraction of lithium in the lithium composite transition metal oxide, and may be 0.9≤x≤1.2, preferably 1.0≤x≤1.2, more preferably 1.0≤x≤1.1.

a represents the atomic fraction of nickel in the lithium composite transition metal oxide, and may be 0.50≤a≤0.75, preferably 0.50≤a≤0.70. When nickel is included in a large amount as such, excellent capacity characteristics can be attained.

b represents the atomic fraction of cobalt in the lithium composite transition metal oxide, and may be 0<b<0.40, preferably 0<b≤0.30.

c represents the atomic fraction of manganese in the lithium composite transition metal oxide, and may be 0<c<0.40, preferably 0<c≤0.30.

d represents the atomic fraction of the doping element M in the lithium composite transition metal oxide, and may be 0<d<0.2, preferably 0<d≤0.15.

Meanwhile, the lithium composite transition metal oxide may include, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S. When such a coating layer is included, since the contact between a transition metal in the lithium composite transition metal oxide and an electrolyte is suppressed, a reduction in the structural stability of the lithium composite transition metal oxide due to a reaction with the electrolyte can be prevented. The lithium composite transition metal oxide preferably includes a B element in the coating layer, and more preferably includes a B element and a W element.

Meanwhile, the content of transition metal elements in the lithium composite transition metal oxide may be constant regardless of a position, or the content of one or more transition metal elements may vary depending on a position inside a particle. For example, the lithium composite transition metal oxide may have a concentration gradient in which the concentration of one or more components among Ni, Mn and Co gradually changes. Here, the "concentration gradient in which a concentration gradually changes" means that there is a concentration distribution in which the concentration of a component(s) continues to gradually change throughout either an entire particle or a specific region of a particle.

Meanwhile, in the present invention, a lithium composite transition metal oxide powder which undergoes a 3% or less, preferably 2% or less, change in Li—O interlayer spacing in a SOC range of 58% to 86% is used as the positive electrode active material. In this case, the degree of change in Li—O interlayer spacing in a SOC range of 58% to 86% may be calculated according to the following Equation (1).

Degree of change in Li—O interlayer spacing in a SOC range of 58% to 86% (%)={(Lithium-oxygen interlayer spacing at 58% SOC−Lithium-oxygen interlayer spacing at 86% SOC)/Lithium-oxygen interlayer spacing at 58% SOC}×100   Equation (1):

When the degree of change in the Li—O interlayer spacing of the lithium composite transition metal oxide in a SOC range of 58% to 86% exceeds 3%, a strain occurs in the lattice structure during high-voltage charging, causing the Li—O layers to move, and as a result, the passages through which lithium migrates (i.e., lithium path) are blocked and thus lithium ions cannot migrate smoothly, and accordingly, the lifetime characteristics and capacity characteristics of the lithium secondary battery are degraded.

In addition, the lithium composite transition metal oxide powder may undergo a 6% or more, preferably 6 to 10%, change in TM-O interlayer spacing in a SOC range of 58% to 86%.

In this case, the degree of change in TM-O interlayer spacing in a SOC range of 58% to 86% may be calculated according to the following Equation (2).

Degree of change in TM-O interlayer spacing in a SOC range of 58% to 86% (%)={(Transition metal-oxygen interlayer spacing at 58% SOC−Transition metal-oxygen interlayer spacing at 86% SOC)/Transition metal-oxygen interlayer spacing at 58% SOC}×100   Equation (2):

According to the research conducted by the inventors of the present invention, when a lithium composite transition metal oxide powder that satisfies the above-described range of degree of change in TM-O interlayer spacing (i.e., $TMO_6$ slab thickness) in a SOC range of 58% to 86% is used, the battery performance at high voltage is even more improved. Although the reason for the phenomenon is not clear, it is assumed that when the TM-O interlayer spacing changes by a large degree in a SOC range of 58 to 86%, the change in Li—O interlayer spacing in the same SOC range is relatively suppressed and, accordingly, an effect of preventing a reduction in lithium mobility which would otherwise be caused due to a reduction in Li—O interlayer spacing is provided.

Meanwhile, the degree of change in Li—O interlayer spacing and TM-O interlayer spacing during charging may be determined by obtaining HRPD data using synchrotron radiation and analyzing the obtained data according to a Rietveld method. Specifically, in a charged state, the change in Li—O interlayer spacing and TM-O interlayer spacing may be measured by the following method. First, a coin-type half-cell is fabricated by interposing a separator between a positive electrode, which includes a lithium composite transition metal oxide to be analyzed as a positive electrode active material, and a lithium metal negative electrode. A plurality of coin-type half-cells produced as described above are charged to different SOCs.

Subsequently, each of the secondary batteries is disassembled to separate the positive electrode therefrom. The positive electrode active material layer is scraped off from the separated positive electrode to obtain the lithium composite transition metal oxide powder in a charged state, which is then exposed to synchrotron radiation so that HRPD data can be obtained. By analyzing the obtained data according to the method of analyzing a crystal structure by the Rietveld method using the space group R-3m in the crystal structure model, the Li—O interlayer spacing and TM-O interlayer spacing of the lithium composite transition metal oxide powder at each degree of charging can be determined, and based on this result, the degree of change in Li—O interlayer spacing and TM-O interlayer spacing according to a degree of charging can be determined.

Meanwhile, the change in the Li—O interlayer spacing and TM-O interlayer spacing of a lithium composite transition metal oxide powder during charging is determined by a combination of the composition of the lithium composite transition metal oxide powder, types of doping and coating elements, particle size and the like, and not by a single factor.

In the present invention, the positive electrode active material may be included in an amount of 80 to 99 wt %, more specifically 85 to 98.5 wt %, based on the total weight of the positive electrode active material layer. When the content of the positive electrode active material satisfies the above-described range, excellent capacity characteristics can be exhibited.

Meanwhile, the positive electrode of the present invention may further include a conductive material and/or a binder in addition to the positive electrode active material.

The conductive material is used to impart conductivity to the electrode, and may be used without particular limitation as long as it does not cause a chemical change in a battery being produced and has electron conductivity. Specific examples of the conductive material include: graphite such as natural graphite, artificial graphite or the like; a carbon-based material such as carbon black, acetylene black, Ketjen black, channel black, furnace black, lamp black, thermal black, carbon fiber or the like; a metal powder or metal fiber of copper, nickel, aluminum, silver or the like; a conductive whisker such as zinc oxide, potassium titanate or the like; a conductive metal oxide such as titanium oxide or the like; and a conductive polymer such as a polyphenylene derivative or the like, which may be used alone or in combination of two or more thereof. The conductive material may be included in an amount of 0.1 to 15 wt % based on the total weight of the positive electrode active material layer.

The binder serves to improve the adhesion between positive electrode active material particles and the adhesion between the positive electrode active material and a current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, styrene-butadiene rubber (SBR), fluoro-rubber, various copolymers thereof and the like, which may be used alone or in combination of two or more thereof. The binder may be included in an amount of 0.1 to 15 wt % based on the total weight of the positive electrode active material layer.

The above-described positive electrode may be produced by a common method of producing a positive electrode, for example, by applying a positive electrode mixture prepared by dissolving or dispersing a positive electrode active material, a binder and/or a conductive material in a solvent onto a positive electrode current collector and then carrying out drying and rolling.

The solvent may be a solvent generally used in the art. Examples of the solvent include dimethyl sulfoxide (DMSO), isopropyl alcohol, N-methylpyrrolidone (NMP), acetone, water and the like, which may be used alone or in combination of two or more thereof. The usage amount of the solvent is not particularly limited, and is sufficient if it allows the viscosity of the positive electrode mixture to be appropriately adjusted considering the coating thickness, production yield, workability and the like of the positive electrode mixture.

Meanwhile, the positive electrode current collector is not particularly limited as long as it does not cause a chemical change in the battery and has conductivity. For example, stainless steel, aluminum, nickel, titanium, calcined carbon, or aluminum or stainless steel whose surface has been treated with carbon, nickel, titanium, silver or the like may be used. In addition, the positive electrode current collector may typically have a thickness of 3 to 500 m, and may have fine irregularities in a surface thereof to increase the adhesion with a positive electrode material. The positive electrode current collector may be used in any of various forms such as a film, a sheet, a foil, a net, a porous material, a foam, a non-woven fabric and the like.

Alternatively, the positive electrode may be produced by laminating, on a positive electrode current collector, a film prepared by casting the positive electrode mixture on a separate support and then removing it from the support.

(2) Negative Electrode

The negative electrode may be used without particular limitation as long as it is a negative electrode that is typically used in a lithium secondary battery, and may include, for example, a negative electrode current collector and a negative electrode active material layer disposed on the negative electrode current collector.

The negative electrode current collector is not particularly limited as long as it does not cause a chemical change in the battery and has high conductivity. For example, copper, stainless steel, aluminum, nickel, titanium, calcined carbon, or copper or stainless steel whose surface has been treated with carbon, nickel, titanium, silver or the like, an aluminum-cadmium alloy or the like may be used. In addition, the negative electrode current collector may typically have a thickness of 3 μm to 500 μm, and like the positive electrode current collector, may have fine irregularities in a surface thereof to increase the adhesion with a negative electrode active material. The negative electrode current collector may be used in any of various forms such as a film, a sheet, a foil, a net, a porous material, a foam, a non-woven fabric and the like.

The negative electrode active material layer may include an optional binder and an optional conductive material in addition to the negative electrode active material.

As the negative electrode active material, any of various negative electrode active materials used in the art may be used without particular limitation. Specific examples of the negative electrode active material include: a carbonaceous material such as artificial graphite, natural graphite, graphitized carbon fiber, amorphous carbon or the like; a metallic compound capable of alloying with lithium, such as Si, Al, Sn, Pb, Zn, Bi, In, Mg, Ga, Cd, a Si alloy, a Sn alloy, an Al alloy or the like; a metal oxide capable of doping and dedoping lithium, such as $SiO_y$ ($0<y<2$), $SnO_2$, vanadium oxide or lithium vanadium oxide; a composite including the metallic compound and the carbonaceous material, such as a Si—C composite or a Sn—C composite; and the like, which may be used alone or in combination of two or more thereof. In addition, as the negative electrode active material, a metal lithium thin film may be used.

Meanwhile, the negative electrode active material may be included in an amount of 80 wt % to 99 wt % based on the total weight of the negative electrode active material layer.

The binder is a component that assists the binding among a conductive material, an active material and a current collector, and is typically added in an amount of 0.1 wt % to 10 wt % based on the total weight of the negative electrode active material layer. Examples of such a binder include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, styrene-butadiene rubber, nitrile-butadiene rubber, fluoro-rubber, various copolymers thereof and the like.

The conductive material is a component for further enhancing the conductivity of the negative electrode active material, and may be added in an amount of 10 wt % or less, preferably 5 wt % or less, based on the total weight of the negative electrode active material layer. Such a conductive material is not particularly limited as long as it does not cause a chemical change in the battery and has conductivity, and examples of a material usable as the conductive material include: graphite such as natural graphite, artificial graphite or the like; carbon black such as acetylene black, Ketjen black, channel black, furnace black, lamp black, thermal black or the like; a conductive fiber such as carbon fiber, metal fiber or the like; a metal powder such as carbon fluoride powder, aluminum powder, nickel powder or the like; a conductive whisker such as zinc oxide, potassium titanate or the like; a conductive metal oxide such as titanium oxide or the like; and a conductive material such as a polyphenylene derivative or the like.

The negative electrode active material layer may be prepared by applying a composition for forming a negative electrode active material layer, which is prepared by dissolving or dispersing a negative electrode active material, an optional binder and an optional conductive material in a solvent, onto a negative electrode current collector and then carrying out drying, or by laminating, on a negative electrode current collector, a film prepared by casting the composition for forming a negative electrode active material layer on a separate support and then removing it from the support.

(3) Separator

The separator is interposed between the negative electrode and the positive electrode, separating the positive electrode and the negative electrode and providing a passage for lithium ion migration. As the separator, a separator commonly used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer, an ethylene/methacrylate copolymer or the like or a stacked structure having two or more layers thereof, may be used. In addition, a common porous non-woven fabric, for example, a non-woven fabric made of high-melting-point glass fiber, polyethylene terephthalate fiber or the like may be used. Also, in order to ensure heat resistance or mechanical strength, a coated separator which includes a ceramic component or polymer material and is optionally in a single-layer or multi-layer structure may be used.

(4) Electrolyte

As the electrolyte, an organic liquid electrolyte, an inorganic liquid electrolyte, a solid polymer electrolyte, a gel-type polymer electrolyte, an inorganic solid electrolyte, a molten-type inorganic electrolyte or the like that is usable in a lithium secondary battery may be used without particular limitation.

Specifically, the electrolyte may include an organic solvent and a lithium salt.

As the organic solvent, a solvent which may function as a medium through which ions involved in an electrochemical reaction of the battery can migrate may be used without particular limitation. Specifically, the organic solvent may be: an ester-based solvent such as methyl acetate, ethyl acetate, γ-butyrolactone, ε-caprolactone or the like; an ether-based solvent such as dibutyl ether, tetrahydrofuran or the like; a ketone-based solvent such as cyclohexanone or the like; an aromatic hydrocarbon-based solvent such as benzene, fluorobenzene or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC) or the like; an alcohol-based solvent such as ethyl alcohol, isopropyl alcohol or the like; a nitrile such as Ra—CN (Ra is a C2-C20 hydrocarbon group with a linear, branched or cyclic structure and may include a double-bond, aromatic ring or an ether linkage) or the like; an amide such as dimethylformamide or the like; dioxolane such as 1,3-dioxolane or the like; or sulfolane.

As the lithium salt, a lithium salt that is conventionally used in an electrolyte for a lithium secondary battery may be used without particular limitation. For example, the lithium salt may be a lithium salt which has $Li^+$ as an cation and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ as an anion. Specifically, the lithium salt may include one or a mixture of two or more selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$ and $LiCH_3SO_3$, and additionally, an electrolyte salt commonly used in an electrolyte of a lithium secondary battery, such as a lithium imide salt represented as $LiN(SO_2C_2F_5)_2$ (lithium bis(perfluoroethane-sulfon)imide (LiBETI)), $LiN(SO_2F)_2$ (lithium fluorosulfonyl imide (LiFSI)) or $LiN(SO_2CF_3)_2$ (lithium bis(trifluoromethanesulfon)imide) (LiTFSI)), may be used without limitation. Specifically, the electrolyte salt may include one or a mixture of two or more selected from the group consisting of $LiPF_6$, $LiBF_4$, $LiCH_3CO_2$, $LiCF_3CO_2$, $LiCH_3SO_3$, LiFSI, LiTFSI and $LiN(C_2F_5SO_2)_2$.

The amount of the lithium salt may be appropriately changed within a range generally available, and may be specifically included in an amount of 0.8 M to 3 M, specifically 0.1 M to 2.5 M, in the electrolyte.

In addition to the above-described electrolyte components, various additives may be used in the electrolyte for the purpose of improving the lifetime characteristics of the battery, suppressing a reduction in battery capacity, improving the discharge capacity of the battery or the like.

As the additive, the following may be used: an imide-based salt such as lithium bis(fluorosulfonyl)imide (LiFSI), lithium bis(trifluoromethylsulfonyl)imide or the like; a borate-based salt such as lithium bis(oxalato)borate (LiBOB), lithium difluoro(oxalato)borate (LiOdFB), tris(trimethylsilyl) borate (TMSB) or the like; a phosphate-based salt such as difluorophosphate or tris(trimethylsilyl) phosphate;

a haloalkylene carbonate-based compound such as difluoroethylene carbonate or the like; or pyridine, triethylphosphite, triethanolamine, cyclic ether, ethylenediamine, n-glyme, hexamethlyphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride or the like, which may be used alone or in combination. In this case, each of the additives may be included in an amount of 0.1 wt % to 10 wt % based on the total weight of the electrolyte.

The above-described lithium secondary battery of the present invention is useful in the field of portable devices such as mobile phones, notebook computers, digital cameras or the like, electric vehicles such as hybrid electric vehicles (HEVs), and the like.

The type of the lithium secondary battery of the present invention may be, but is not particularly limited to, a cylindrical type using a can, a prismatic type, a pouch type, a coin type or the like.

The lithium secondary battery of the present invention may be used not only in a battery cell used as a power source of a small device but also preferably as a unit battery in medium-to-large-sized battery modules including a plurality of battery cells.

[Modes of the Invention]

Hereinafter, the present invention will be described in more detail by way of specific examples.

Preparation Example 1

A lithium composite transition metal oxide powder doped with Zr and Co was prepared by dry-mixing $Ni_{0.6}Co_{0.2}Mn_{0.2}(OH)_2$, $Li_2CO_3H_2O$, $ZrO_2$ and $CoOH_2$ and firing the mixture at 860° C. for 10 hours. The obtained lithium composite transition metal oxide powder had a unimodal particle size distribution having a D50 of 12 µm.

Preparation Example 2

After the lithium composite transition metal oxide prepared in Preparation Example 1 was mixed with $B_4C$ and $W(OH)_2$, the mixture was thermally treated at 350° C. for 10 hours, and thereby a coating layer containing B and W was formed on the surface of the lithium composite transition metal oxide. The obtained lithium composite transition metal oxide powder had a unimodal particle size distribution having a D50 of 12 µm.

Preparation Example 3

A lithium composite transition metal oxide powder doped with Zr was prepared by dry-mixing $Ni_{0.6}Co_{0.2}Mn_{0.2}(OH)_2$, $Li_2CO_3H_2O$ and $ZrO_2$ and firing the mixture at 860° C. for 10 hours.

After the lithium composite transition metal oxide prepared as described above was mixed with $B_4C$, the mixture was thermally treated at 350° C. for 10 hours, and thereby a coating layer containing B was formed on the surface of the lithium composite transition metal oxide. The obtained lithium composite transition metal oxide powder had a unimodal particle size distribution having a D50 of 12 km.

Preparation Example 4

A lithium composite transition metal oxide powder doped with Zr was prepared by dry-mixing $Ni_{0.5}Co_{0.2}Mn_{0.3}(OH)_2$, $Li_2CO_3H_2O$ and $ZrO_2$ and firing the mixture at 860° C. for 10 hours.

After the lithium composite transition metal oxide prepared as described above was mixed with $SiO_2$, the mixture was thermally treated at 350° C. for 10 hours, and thereby a coating layer containing Si was formed on the surface of the lithium composite transition metal oxide. The obtained lithium composite transition metal oxide powder had a unimodal particle size distribution having a D50 of 12 km.

Experimental Example 1

Each of the lithium composite transition metal oxides prepared in Preparation Examples 1 to 4 was mixed with a carbon black conductive material and a PVdF binder at a weight ratio of 96:2:2 in an N-methylpyrrolidone solvent to prepare a positive electrode mixture, which was subsequently applied to one surface of an aluminum current collector, dried at 130° C., and then rolled to produce a positive electrode.

A porous polyethylene separator was interposed between the positive electrode produced as described above and a negative electrode, and thereby an electrode assembly was produced. After the electrode assembly was placed in a case, an electrolyte was injected into the case, and thereby a lithium secondary battery (coin-type half-cell) was produced.

In this case, a lithium metal was used as the negative electrode, and an electrolyte which was prepared by dissolving lithium hexafluorophosphate ($LiFP_6$) at a concentration of 1 M in an organic solvent consisting of ethylene carbonate, dimethyl carbonate, and ethyl methyl carbonate mixed at a volume ratio of 3:4:3 was used as the electrolyte.

Eight lithium secondary batteries were prepared for each of the lithium composite transition metal oxides, and were charged at 0 mA/g, 40 mA/g, 80 mA/g, 120 mA/g, 160 mA/g, 200 mA/g, 240 mA/g, 278 mA/g, respectively. After subsequently separating the positive electrode from each lithium secondary battery, the positive electrode active material layer was scraped off therefrom to obtain the lithium composite transition metal oxide powder. The collected lithium composite transition metal oxide powder was placed in a radiation accelerator and was subjected to X-ray analysis, and thereby a Li—O interlayer spacing and a TM-O interlayer spacing according to a degree of charging were determined.

The measurement results are shown in FIGS. 1 to 4. In addition, the Li—O interlayer spacing and TMWO interlayer spacing according to SOC were calculated based on FIGS. 1 to 4 by converting the charge capacity values into SOC values, and the results are shown in Table 1 and Table 2.

TABLE 1

| | Lithium-oxygen interlayer spacing [Å] | | | |
|---|---|---|---|---|
| | Preparation Example 1 | Preparation Example 2 | Preparation Example 3 | Preparation Example 4 |
| 0% SOC | 2.5615 | 2.6072 | 2.5402 | 2.5658 |
| 14% SOC | 2.6153 | 2.6071 | 2.6069 | 2.6104 |
| 29% SOC | 2.6503 | 2.6509 | 2.6529 | 2.6549 |
| 43% SOC | 2.7183 | 2.695 | 2.7186 | 2.6996 |
| 58% SOC | 2.7589 | 2.7337 | 2.7631 | 2.7659 |
| 72% SOC | 2.7513 | 2.7318 | 2.7552 | 2.7575 |
| 86% SOC | 2.7163 | 2.6798 | 2.6684 | 2.6577 |

TABLE 1-continued

| | Lithium-oxygen interlayer spacing [Å] | | | |
| --- | --- | --- | --- | --- |
| | Preparation Example 1 | Preparation Example 2 | Preparation Example 3 | Preparation Example 4 |
| 100% SOC | 2.6245 | 2.6209 | 2.6062 | 2.6317 |
| Degree of change in Li—O interlayer spacing in SOC range of 58 to 86% | 1.54% | 1.97% | 3.42% | 3.91% |

TABLE 2

| | Transition metal-oxygen interlayer spacing [Å] | | | |
| --- | --- | --- | --- | --- |
| | Preparation Example 1 | Preparation Example 2 | Preparation Example 3 | Preparation Example 4 |
| 0% SOC | 2.175 | 2.1505 | 2.199 | 2.1786 |
| 14% SOC | 2.1415 | 2.1504 | 2.1502 | 2.1531 |
| 29% SOC | 2.1336 | 2.1341 | 2.1357 | 2.1373 |
| 43% SOC | 2.0996 | 2.1175 | 2.0999 | 2.1211 |
| 58% SOC | 2.0744 | 2.0961 | 2.0726 | 2.0695 |
| 72% SOC | 2.0386 | 2.0441 | 2.0265 | 2.0331 |
| 86% SOC | 1.9349 | 1.9565 | 1.9578 | 2.0379 |
| 100% SOC | 1.9638 | 1.961 | 1.9501 | 1.9692 |
| Degree of change in TM-O interlayer spacing in SOC range of 58 to 86% | 6.72% | 6.67% | 5.53% | 1.52% |

As shown in Table 1, Table 2 and FIGS. 1 to 4, whereas the lithium composite transition metal oxides prepared in Preparation Examples 1 and 2 underwent a 2% or less change in Li—O interlayer spacing in a SOC range of 58% to 86%, the lithium composite transition metal oxides prepared in Preparation Examples 3 and 4 underwent a more than 3% change in Li—O interlayer spacing in a SOC range of 58% to 86%.

In addition, whereas the lithium composite transition metal oxides prepared in Preparation Examples 1 and 2 underwent a 6% or more change in TM-O interlayer spacing in a SOC range of 58% to 86%, the lithium composite transition metal oxides prepared in Preparation Examples 3 and 4 underwent a less than 6% change in TM-O interlayer spacing in the same SOC range.

Example 1-1

A positive electrode mixture was prepared by mixing the lithium composite transition metal oxide prepared in Preparation Example 1 as a positive electrode active material, a carbon black conductive material and a PVdF binder at a weight ratio of 96:2:2 in an N-methylpyrrolidone solvent, and was subsequently applied to one surface of an aluminum current collector, dried at 130° C., and then rolled to produce a positive electrode.

A porous polyethylene separator was interposed between the positive electrode produced as described above and a negative electrode, and thereby an electrode assembly was produced. After the electrode assembly was placed in a case, an electrolyte was injected into the case, and thereby a lithium secondary battery (coin-type half-cell) was produced.

In this case, a lithium metal was used as the negative electrode, and an electrolyte which was prepared by dissolving lithium hexafluorophosphate ($LiFP_6$) at a concentration of 1 M in an organic solvent consisting of ethylene carbonate, dimethyl carbonate, and ethyl methyl carbonate mixed at a volume ratio of 3:4:3 was used as the electrolyte.

Example 2-1

A lithium secondary battery was produced in the same manner as in Example 1-1 except that the lithium composite transition metal oxide prepared in Preparation Example 2 was used as a positive electrode active material.

Comparative Example 1-1

A lithium secondary battery was produced in the same manner as in Example 1-1 except that the lithium composite transition metal oxide prepared in Preparation Example 3 was used as a positive electrode active material.

Comparative Example 2-1

A lithium secondary battery was produced in the same manner as in Example 1-1 except that the lithium composite transition metal oxide prepared in Preparation Example 4 was used as a positive electrode active material.

Experimental Example 2: Evaluation of High-Voltage Capacity

The capacity characteristics of the lithium secondary batteries of Examples 1-1 and 2-1 and Comparative Examples 1-1 and 2-1 were evaluated by the following method. In order to remove temperature-dependent variables during the intercalation and deintercalation of lithium ions, the lithium secondary batteries of the above-described Examples and Comparative Examples were subjected to charging-discharging cycles in a 25° C. constant-temperature chamber, wherein the charging/discharging conditions applied for evaluating high-voltage capacity characteristics were as follows: after a current value calculated based on a current value for the first charging-discharging of 0.2C and a reference capacity of 200 mAh/g was applied using a charger/discharger, the capacity calculated upon charging to 4.4 V was evaluated as a charge capacity and the capacity calculated upon discharging to 2.5 V was evaluated as a discharge capacity, and the ratio of the discharge capacity to the charge capacity was defined as the initial efficiency. The measurement results are shown in the following Table 3.

TABLE 3

| | Charge capacity (mAh/g) | Discharge capacity (mAh/g) | Initial efficiency (%) |
| --- | --- | --- | --- |
| Example 1-1 | 210.5 | 183.8 | 87.3 |
| Example 2-1 | 209.8 | 183.0 | 87.2 |
| Comparative Example 1-1 | 210.3 | 183.0 | 87.0 |
| Comparative Example 2-1 | 209.0 | 180.6 | 86.4 |

As shown in Table 3, the lithium secondary batteries of Examples 1-1 and 2-1, in which the lithium composite transition metal oxides of Preparation Examples 1 and 2 undergoing a 3% or less change in Li—O interlayer spacing in a SOC range of 58 to 86% were respectively used, exhibited better capacity characteristics at high voltage than the lithium secondary batteries of Comparative Examples 1-1 and 2-1 in which the lithium composite transition metal oxides of Preparation Examples 3 and 4 undergoing a more than 3% change in Li—O interlayer spacing in the same SOC range were respectively used.

Example 1-2

A positive electrode mixture was prepared by mixing the lithium composite transition metal oxide prepared by Preparation Example 1 as a positive electrode active material, a carbon black conductive material and a PVdF binder at a weight ratio of 96:2:2 in an N-methylpyrrolidone solvent, and was subsequently applied to one surface of an aluminum current collector, dried, and rolled to produce a positive electrode.

Next, a negative electrode mixture was prepared by mixing a graphite-based negative electrode active material, a carbon black conductive material and a PVdF binder at a weight ratio of 98:1:1 in an N-methylpyrrolidone solvent, and was subsequently applied to one surface of a copper current collector, dried, and rolled to produce a negative electrode.

A porous polyethylene separator was interposed between the positive electrode produced as described above and a negative electrode, and thereby an electrode assembly was produced. After the electrode assembly was placed in a case, an electrolyte was injected into the case, and thereby a lithium secondary battery (full cell) was produced.

In this case, an electrolyte which was prepared by dissolving lithium hexafluorophosphate (LiFP$_6$) at a concentration of 1 M in an organic solvent consisting of ethylene carbonate, dimethyl carbonate and ethyl methyl carbonate mixed at a volume ratio of 3:4:3 was used as the electrolyte.

Example 2-2

A lithium secondary battery (full cell) was produced in the same manner as in Example 1-2 except that the lithium composite transition metal oxide prepared in Preparation Example 2 was used as a positive electrode active material.

Comparative Example 1-2

A lithium secondary battery (full cell) was produced in the same manner as in Example 1-2 except that the lithium composite transition metal oxide prepared in Preparation Example 3 was used as a positive electrode active material.

Comparative Example 2-2

A lithium secondary battery (full cell) was produced in the same manner as in Example 1-2 except that the lithium composite transition metal oxide prepared in Preparation Example 4 was used as a positive electrode active material.

Experimental Example 3: Evaluation of High-Voltage Lifetime Characteristics

The high-voltage lifetime characteristics of the lithium secondary batteries produced in Examples 1-2 and 2-2 and Comparative Examples 1-2 and 2-2 were evaluated by the following method.

For an accelerated lifetime test, a discharge capacity was monitored while repeating 100 charge-discharge cycles in a 45° C. constant-temperature chamber, and the lifetime characteristics were determined by the ratio of a discharge capacity at the 100$^{th}$ charging/discharging to the initial discharge capacity. The applied charge/discharge current was measured in the range of 2.5 V (lower-limit voltage) to 4.4 V (upper-limit voltage), based on a charge current of 0.7C, a discharge current of 0.5C, and a reference capacity of 200 mAh/g. The results of evaluating the high-voltage lifetime characteristics at 45° C. are shown in the following Table 4.

TABLE 4

|  | Lifetime characteristics (%) |
| --- | --- |
| Example 1-2 | 96.3 |
| Example 2-2 | 95.9 |
| Comparative Example 1-2 | 91.7 |
| Comparative Example 2-2 | 90.6 |

As shown in Table 4, the lithium secondary batteries of Examples 1-2 and 2-2, in which the lithium composite transition metal oxides of Preparation Examples 1 and 2 undergoing a 3% or less change in Li—O interlayer spacing in a SOC range of 58 to 86% were respectively used, exhibited better lifetime characteristics at high voltage than the lithium secondary batteries of Comparative Examples 1-2 and 2-2 in which lithium composite transition metal oxides of Preparation Examples 3 and 4 undergoing a more than 3% change in Li—O interlayer spacing were respectively used.

The invention claimed is:

1. A lithium secondary battery comprising:
a positive electrode;
a negative electrode;
a separator interposed between the positive electrode and the negative electrode; and
an electrolyte,
wherein the positive electrode includes, as a positive electrode active material, a lithium composite transition metal oxide powder having a layered structure and a nickel content accounting for 50 atm % to 75 atm % of total transition metals,
wherein the lithium composite transition metal oxide powder undergoes a 3% or less change in lithium-oxygen (Li—O) interlayer spacing in a state-of-charge (SOC) range of 58% to 86%,
wherein the lithium composite transition metal oxide is represented by Chemical Formula 1:

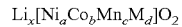  [Chemical Formula 1]

wherein M is a doping element and includes Zr and Co, and 0.9≤x≤1.2, 0.50≤a≤0.75, 0≤b≤0.4, 0≤c≤0.4, and 0≤d≤0.2.

2. The lithium secondary battery of claim 1, wherein the lithium composite transition metal oxide powder undergoes a 2% or less change in the Li—O interlayer spacing in the SOC range of 58% to 86%.

3. The lithium secondary battery of claim 1, wherein the lithium composite transition metal oxide powder undergoes a 6% or more change in transition metal-oxygen (TM-0) interlayer spacing in a SOC range of 58% to 86%.

4. The lithium secondary battery of claim 1, wherein the lithium composite transition metal oxide includes, on a surface thereof, a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si and S.

5. The lithium secondary battery of claim 1, wherein the coating layer includes B and W.

6. A positive electrode active material for a lithium secondary battery, comprising: a lithium composite transition metal oxide powder having a layered structure and a nickel content accounting for 50 atm % to 75 atm % of total transition metals,
   wherein the lithium composite transition metal oxide powder undergoes a 3% or less change in Li—O interlayer spacing in a SOC range of 58% to 86%
   wherein the lithium composite transition metal oxide is represented by Chemical Formula 1:

$$Li_x[Ni_aCo_bMn_cM_d]O_2 \qquad \text{[Chemical Formula 1]}$$

wherein M is a doping element and includes Zr and Co, and $0.9 \leq x \leq 1.2$, $0.50 \leq a \leq 0.75$, $0 \leq b \leq 0.4$, $0 \leq c \leq 0.4$, and $0 \leq d \leq 0.2$.

\* \* \* \* \*